(12) United States Patent
Gonthier et al.

(10) Patent No.: US 10,014,797 B2
(45) Date of Patent: Jul. 3, 2018

(54) AC/DC CONVERTER WITH INRUSH CURRENT LIMITATION

(71) Applicant: STMicroelectronics (Tours) SAS, Tours (FR)

(72) Inventors: Laurent Gonthier, Taipei (TW); Muriel Nina, Saint Cyr sur Loire (FR); Romain Pichon, Reugny (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 15/659,822

(22) Filed: Jul. 26, 2017

(65) Prior Publication Data
US 2017/0324350 A1 Nov. 9, 2017

Related U.S. Application Data

(63) Continuation of application No. 14/956,482, filed on Dec. 2, 2015, now Pat. No. 9,755,541.

(30) Foreign Application Priority Data

Apr. 7, 2015 (FR) ...................................... 15 52985

(51) Int. Cl.
*H02M 7/162* (2006.01)
*H02M 1/08* (2006.01)
(Continued)

(52) U.S. Cl.
CPC ........... *H02M 7/162* (2013.01); *H02M 1/081* (2013.01); *H02M 7/062* (2013.01); *H02M 7/125* (2013.01); *H02M 7/1623* (2013.01)

(58) Field of Classification Search
CPC ...... H02M 7/162; H02M 1/081; H02M 7/062; H02M 7/125; H02M 7/1623
See application file for complete search history.

(56) References Cited

U.S. PATENT DOCUMENTS 3,857,083 A 12/1974 Lundstrom
3,953,781 A 4/1976 Forster et al.
(Continued)

FOREIGN PATENT DOCUMENTS

| EP | 0633652 A2 | 1/1995 |
| EP | 2533409 A1 | 12/2012 |
| JP | 2000233092 A | 8/2000 |

OTHER PUBLICATIONS

Compack thyristor module platform a new design that reduces parts and material costs with higher power density—Dec. 31, 2013—XP055245468.
(Continued)

*Primary Examiner* — Emily P Pham
(74) *Attorney, Agent, or Firm* — Crowe & Dunlevy

(57) ABSTRACT

An AC/DC converter includes: a first terminal and a second terminal for receiving an AC voltage and a third terminal and a fourth terminal for supplying a DC voltage. A rectifying bridge includes input terminals respectively coupled to the first terminal and the second terminal, and output terminals respectively coupled to the third terminal and fourth terminal. A first branch of the rectifying bridge includes, connected between the output terminals, two series-connected thyristors with a junction point of the two thyristors being connected to a first one of the input terminals. A second branch of the rectifying bridge is formed by series connected diodes. A control circuit is configured to generate control signals for application to the control gates of the thyristors.

18 Claims, 5 Drawing Sheets

(51) Int. Cl.
*H02M 7/06* (2006.01)
*H02M 7/12* (2006.01)

(56) References Cited

U.S. PATENT DOCUMENTS

| | | | |
|---|---|---|---|
| 4,045,722 A | 8/1977 | Tachibana | |
| 4,075,510 A | 2/1978 | Pascente | |
| 4,314,322 A | 2/1982 | Plow et al. | |
| 4,641,234 A | 2/1987 | Bonal | |
| 4,673,858 A | 6/1987 | Saito | |
| 4,837,672 A | 6/1989 | Donze | |
| 5,468,976 A | 11/1995 | Evseev et al. | |
| 5,572,415 A | 11/1996 | Mohan | |
| 5,621,628 A | 4/1997 | Miyazaki et al. | |
| 5,796,601 A | 8/1998 | Yamamoto | |
| 5,798,520 A | 8/1998 | Kuijk et al. | |
| 5,886,892 A | 3/1999 | Radley et al. | |
| 5,995,395 A | 11/1999 | Rivet | |
| 6,055,167 A * | 4/2000 | Shamkovich | H02M 1/4225 323/300 |
| 6,608,770 B2 | 8/2003 | Vinciarelli et al. | |
| 7,078,870 B2 | 7/2006 | Bocchiola | |
| 7,394,675 B2 | 7/2008 | Hwang | |
| 8,653,700 B2 | 2/2014 | Busch | |
| 8,711,587 B2 | 4/2014 | Momose et al. | |
| 9,774,243 B2 * | 9/2017 | Gonthier | H02M 1/32 |
| 2006/0072353 A1 | 4/2006 | Mhaskar et al. | |
| 2016/0373021 A1 * | 12/2016 | Gonthier | H02M 1/32 |

OTHER PUBLICATIONS

INPI Search Report and Written Opinion for FR 1552985 dated Feb. 4, 2016 (10 pages).
Takano, H, et al: "Comparative Study of Resonant and Non-Resonant DC-DC Converter With Parasitic LC Components of High-Voltage Transformer," Conference Record of the 1998 IEEE Industry Applications Conference, 33rd IAS Annual Meeting, St. Louis, MO, Oct. 12-15, 1998, pp. 1580-1587, XP000876198.

* cited by examiner

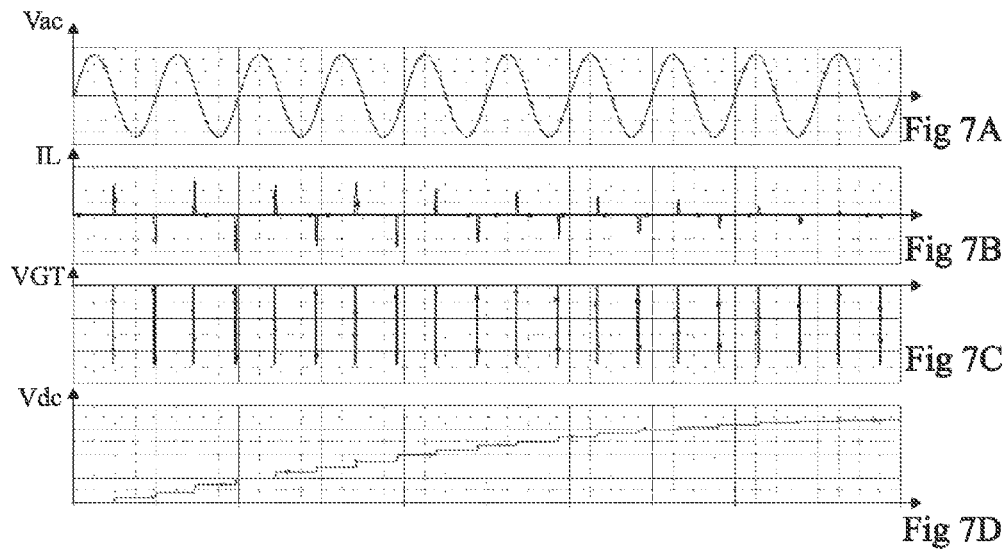
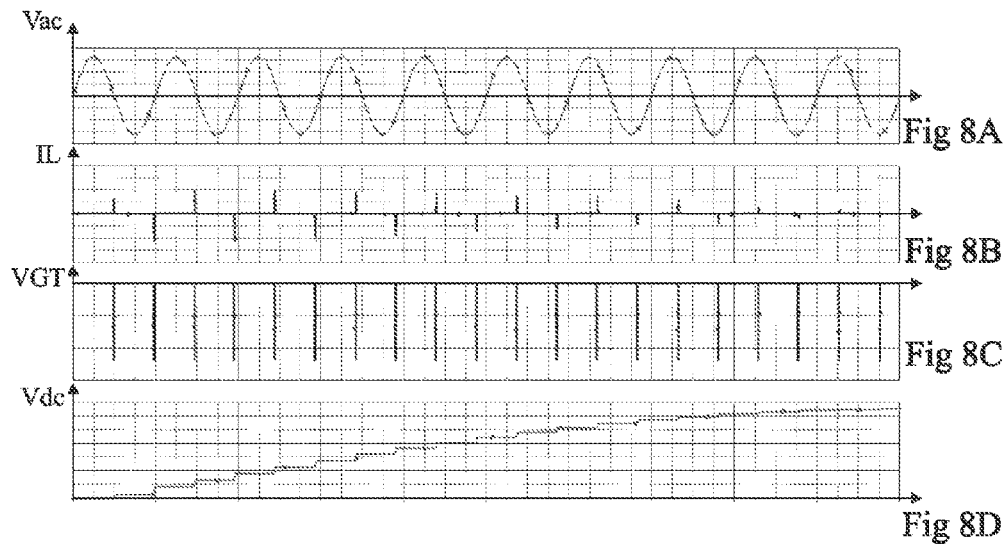

AC/DC CONVERTER WITH INRUSH CURRENT LIMITATION

CROSS REFERENCE TO RELATED APPLICATIONS

This application is a continuation of U.S. patent application Ser. No. 14/956,482 filed Dec. 2, 2015, which claims the priority benefit of French Application for Patent No. 1552985, filed on Apr. 7, 2015, the disclosures of which are hereby incorporated by reference in their entireties.

TECHNICAL FIELD

The present disclosure generally relates to electronic devices and, more specifically, to AC/DC converters. The present disclosure generally applies to any system using a rectifying bridge, for example, circuits for controlling electric motors, electric chargers, switched-mode power supplies, etc.

BACKGROUND

Many AC/DC converter architectures based on rectifying elements are known, which may be controllable (thyristors, for example) or not (diodes, for example), assembled as a rectifying bridge, powered with an AC voltage and delivering a DC voltage, this DC voltage being possibly itself converted back into an AC voltage.

The inrush current, that is, the current peaks which occur on each halfwave of the AC voltage as long as the voltage across a capacitor at the output of the rectifying bridge has not reached a sufficient level is generally desired to be limited and this, particularly, in starting phases.

United States Patent Application Publication No. 2012/0230075 (incorporated by reference) describes an example of an AC/DC converter.

SUMMARY

An embodiment overcomes all or part of the disadvantages of usual power converter control circuits.

An embodiment aims at providing a circuit for limiting the inrush current in a power converter.

An embodiment provides a solution compatible with a voltage-doubling function at the level of a rectifying bridge powered with the AC voltage.

Thus, an embodiment provides an AC/DC converter comprising: a first terminal and a second terminal, intended to receive an AC voltage; a third terminal and a fourth terminal, intended to supply a first DC voltage; a rectifying bridge having input terminals respectively coupled to the first terminal and connected to the second terminal, and having output terminals respectively connected to the third and fourth terminals, a first branch of the bridge comprising, between the output terminals, two series-connected thyristors, respectively with an anode gate and a cathode gate, the junction point of the two thyristors being connected to a first one of said input terminals and the anode gate thyristor being controllable by extraction of a current from its gate.

According to an embodiment, a second branch of the bridge comprises a first diode and a second diode series-connected between the output terminals, the junction point of the diodes being connected to a second one of said input terminals.

According to an embodiment, the cathode-gate thyristor is controlled by injection of a current into its gate.

According to an embodiment, the thyristors are both controlled by extraction of a current from their gate.

According to an embodiment, the thyristors are controlled by a same pulse signal.

According to an embodiment, the thyristors are phase-angle controlled.

According to an embodiment, two series-connected capacitive elements couple the third and fourth terminals, a switch connecting the junction point of the capacitive elements to the second terminal.

According to an embodiment, the gates of the thyristors are controlled by a same transformer, excited by an AC signal.

According to an embodiment, the thyristor gates are controlled by a same transformer, excited by a periodic square-wave positive and negative signal.

According to an embodiment, the converter further comprises: a transformer for generating, from at least a third diode connected to the first one of said input terminals, a first DC voltage for powering a circuit for controlling the thyristors and a second DC voltage applied to said first one of the input terminals.

In an embodiment, an AC/DC converter comprises: a first terminal and a second terminal configured to receive an AC voltage; a third terminal and a fourth terminal configured to supply a first DC voltage; a rectifying bridge having input terminals respectively coupled to the first terminal and second terminal, and having output terminals respectively coupled to the third terminal and fourth terminal, wherein the rectifying bridge includes a first branch comprising a first thyristor and a second thyristor, respectively having an anode gate and a cathode gate, that are series connected between the output terminals, a junction point of the first and second thyristors being connected to a first one of the input terminals; and a controller coupled to the anode gate and configured to generate control pulses that turn on the first thyristor, wherein timing of the control pulses progressively increases a conduction time of the first thyristor over a time period time to control inrush current.

In an embodiment, an AC/DC converter comprises: a first terminal and a second terminal configured to receive an AC voltage; a third terminal and a fourth terminal configured to supply a first DC voltage; a rectifying bridge having input terminals respectively coupled to the first terminal and second terminal, and having output terminals respectively coupled to the third terminal and fourth terminal, wherein the rectifying bridge includes a first branch comprising a first thyristor and a second thyristor, respectively having an anode gate and a cathode gate, that are series connected between the output terminals, a junction point of the first and second thyristors being connected to a first one of the input terminals; and a controller configured to generate first control pulses coupled to the anode gate that turn on the first thyristor and generate second control pulses coupled to the cathode gate that turn on the second thyristor, wherein timing of each of the first and second control pulses progressively increases a conduction time of the first and second thyristors, respectively, over a time period time to control inrush current.

BRIEF DESCRIPTION OF THE DRAWINGS

The foregoing and other features and advantages will be discussed in detail in the following non-limiting description of specific embodiments in connection with the accompanying drawings, wherein:

FIGS. 7A, 7B, 7C, and 7D illustrate, in timing diagrams, the operation of the converter of FIG. 3, in voltage doubling mode;

FIGS. 8A, 8B, 8C, and 8D illustrate, in timing diagrams, the operation of the converter of FIG. 3, in follower mode;

DETAILED DESCRIPTION

Figure 1:
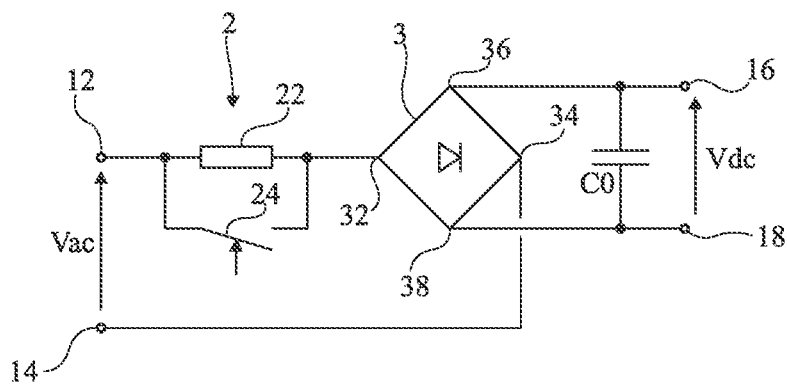
FIG. 1 schematically shows an example of a usual architecture of an AC/DC converter equipped with an inrush current limiting circuit.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the disclosure, term "connected" designates a direct connection between two elements, while terms "coupled" and "linked" designate a connection between two elements, which may be direct or via one or a plurality of other elements. When reference is made to terms "about", "approximately", or "in the order of", this means to within 10%, preferably to within 5%.

FIG. 1 schematically shows an example of an architecture of an AC/DC converter equipped with an inrush current limiting circuit.

Two input terminals 12 and 14 are intended to receive an AC voltage Vac, for example, the voltage of the electric distribution network (for example, 230 or 120 volts, 50 or 60 Hz). Terminal 12 is coupled, via an inrush current limiting assembly 2, to a first rectifying input terminal 32 of a rectifying bridge 3 (for example, fullwave) having its second rectifying input terminal 34 connected to terminal 14. Rectified outputs 36 and 38 of the bridge are respectively connected to output terminals 16 and 18, delivering a DC voltage Vdc. A storage and smoothing capacitor C0 couples terminals 16 and 18. The inrush current limiting assembly is formed of a resistor 22, coupling terminals 12 and 32, and of a switch 24 which may be controlled to short-circuit resistor 22. At the starting (capacitor C0 discharged), switch 24 is turned off and resistor 22 limits the charge current of capacitor C0. In steady state, switch 24 is turned on to short-circuit the resistor and to limit losses.

More sophisticated solutions use, between an input terminal of application of the AC voltage and the rectifying bridge, a device for controlling the bridge turn-on phase angle, that is, for selecting the time, for each halfwave of the AC voltage, from which the rectifying bridge is powered. In such a case, the starting of the converter requires a voltage source to power a circuit for controlling the phase control switch. Current solutions often use complex assemblies.

Figure 2:
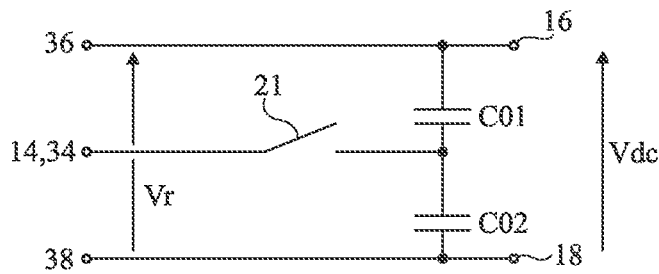
FIG. 2 schematically shows a modification of the assembly of FIG. 1 to form a voltage-doubling converter.

FIG. 2 schematically shows a modification of the assembly of FIG. 1 to form a voltage-doubling converter. Terminal 34 is coupled, via a switch 21, to a junction point of two capacitive circuit elements (capacitors C01 and C02) connecting terminals 16 and 18 (with the possibility of suppressing capacitor C0). Assuming that capacitive elements C01 and C02 have the same capacitance, voltage Vdc between terminals 16 and 18 corresponds, in steady state, to twice peak voltage Vac between terminals 12 and 14.

In the assembly of FIG. 1, the presence of switch 24 generates losses in steady state. In practice, this switch may be formed by a triac and the losses are due to the on-state series resistance of this triac.

Figure 3:
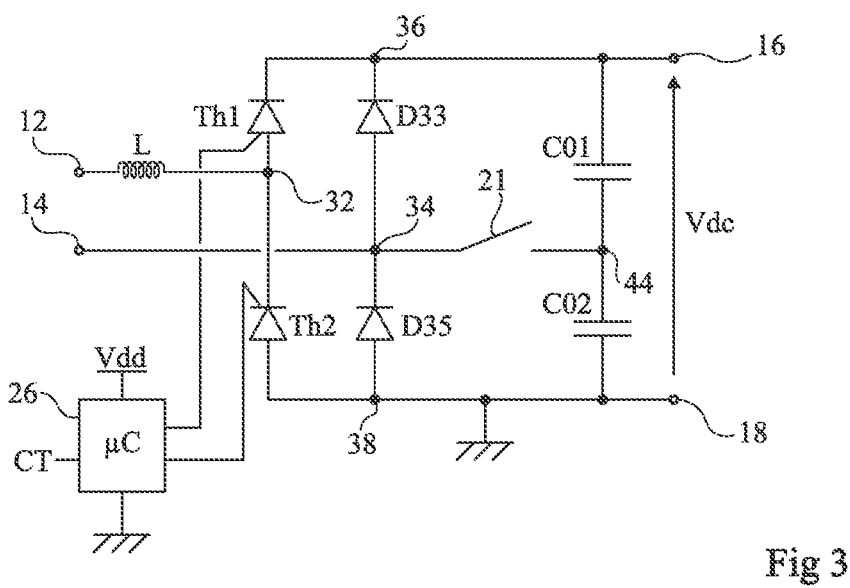
FIG. 3 schematically shows an embodiment of an AC/DC converter.

FIG. 3 schematically shows an embodiment of an AC/DC converter.

It shows a rectifying bridge having input terminals 32 and 34 coupled with first and second terminals 12 and 14 of application of an AC voltage Vac and having rectified output terminals 36 and 38 connected to third and fourth terminals 16 and 18 for supplying a DC voltage Vdc. At least one capacitive element interconnects terminals 16 and 18. In the example of FIG. 3, an inductive circuit element (inductor L) is interposed between a terminal of delivery of voltage Vac (here, terminal 12) and the bridge.

However, unlike the rectifying bridge of FIG. 1, rectifying bridge 3 is here formed of two controllable thyristor-type rectifying elements Th1 and Th2 connected in a branch of the bridge, that is, in series between terminals 36 and 38. In the example of FIG. 3, thyristor Th1, which has an anode gate, connects terminal 32 to terminal 36 with its anode on the side of terminal 32, while thyristor Th2, which has a cathode gate, connects terminal 38 to terminal 32 with its anode on the side of terminal 38. Two diodes D33 and D35 complete the bridge by respectively coupling terminal 34 to terminal 36 and terminal 38 to terminal 34, the anodes of diodes D33 and D35 being respectively on the side of terminal 34 and on the side of terminal 38.

In the example of FIG. 3, a converter capable of operating in voltage-doubling mode or in follower mode is assumed. Accordingly, two capacitive circuit elements (capacitors C01 and C02 of same capacitance value) series-connected between terminals 16 and 18 and an element 21 (for example, a jumper, a switch, a relay, etc.) connecting junction point 44 of capacitive elements C01 and C02 to terminal 14 (and thus to terminal 34) are provided. When connection 21 is open (no connection between terminal 14 and node 44), bridge 3 operates in follower mode, that is, the maximum value of voltage Vdc corresponds to the peak value of voltage Vac (to within losses). When connection 21 is active, the converter operates in voltage-doubling mode, that is, the maximum value of voltage Vdc corresponds to twice the peak value of voltage Vac.

Thyristors Th1 and Th2 are controlled by an electronic circuit, for example, a microcontroller 26, in charge of generating pulses for controlling thyristors Th1 and Th2 and controlling the gates of these thyristors via one or two insulated couplers (not shown in FIG. 3), of optical, magnetic, or capacitive technology. Microcontroller 26 receives different set points CT or measurements to generate the pulses at the right times according, among others, to the needs of the load powered by the converter.

Figure 4:
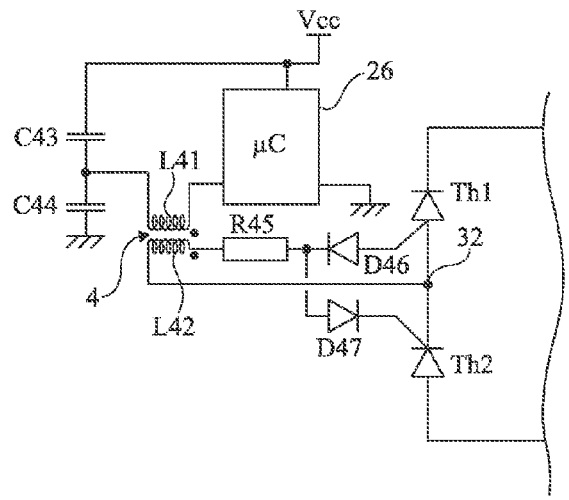
FIG. 4 is a partial electric diagram of an embodiment of a circuit for controlling the converter of FIG. 3.

FIG. 4 partially shows an embodiment of a circuit for controlling thyristors Th1 and Th2 of the assembly of FIG. 3.

Thyristors Th1 and Th2 are selected so that their control is referenced to the same point. Thus, thyristor Th1 is an anode-gate thyristor. Its control is thus referenced to terminal 32. Thyristor Th2 is a cathode-gate thyristor. Its control is thus referenced to the same terminal 32.

In the embodiment of FIG. 4, thyristors Th1 and Th2 are selected to respectively operate by gate current extraction and by gate current injection.

In the circuit of FIG. 4, a first winding L41 of a transformer 4 receives a pulse control from a microcontroller 26 powered with a DC voltage Vcc. The other end of winding L41 is coupled to the junction point of two capacitive elements C43 and C44 between power supply terminal Vcc and the ground. A second winding L42 of transformer 4 has one end connected to terminal 32 and its other end coupled to the gates of thyristors Th1 and Th2. This coupling is performed via an optional series resistor R45 and two diodes D46 and D47 respectively connecting winding L42 (or resistor R45) to the gates of thyristors Th1 and Th2. The anode gate of thyristor Th1 is coupled to the anode of diode D46 while the cathode gate of thyristor Th2 is connected to the cathode of diode D47, the cathode of diode D46 and the anode of diode D47 being connected to winding L42 (or to resistor R45).

The circuit of FIG. 4 thus enables to both inject a gate current into thyristor Th2, and to extract a gate current from thyristor Th1. The two thyristors are thus controlled each time an AC pulse (of +Vcc/2–Vcc/2 type) is applied to primary L41 of transformer 4.

If the two controls are desired to be distinguished, for example, by only controlling thyristor Th1 during positive halfwaves of voltage Vac, and only controlling thyristor Th2 during negative halfwaves of voltage Vac, this is possible by applying across L41 respectively during these two types of halfwaves, a signal of type −Vcc/0 (to turn on thyristor Th1), and a signal of type +Vcc/0 (to turn on thyristor Th2). Since such signals have a DC component, transformer 4 should not have a saturable magnetic material to avoid the saturation of this material and ensure the proper operation of the control signal transfer. A transformer with no magnetic core (or "air transformer") may thus for example be used.

According to another embodiment, thyristors Th1 and Th2 are selected to both operate by extraction of current from their gate. Thus, a same so-called negative power supply voltage Vdd (that is, having its high level, VDD, connected to terminal 32, itself coupled to terminal 12 of the mains) is sufficient to power the two thyristors Th1 and Th2. This same power supply may be used to power the gates of triacs having their control reference connected to terminal 32. Such triacs would be useful to control AC current loads powered with voltage Vac.

The achieving of a function of cathode-gate thyristor controllable by current extraction is known. A triac series-connected with a diode to be made unidirectional may for example be used.

Figure 5:
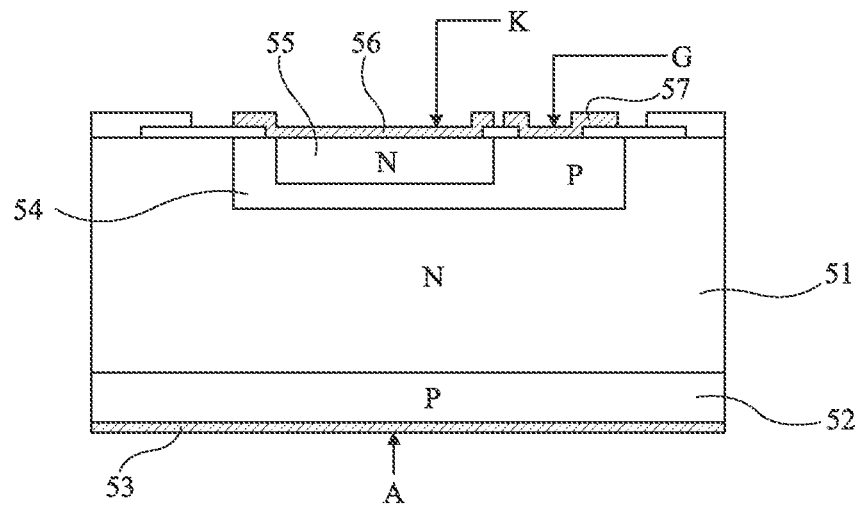
FIG. 5 is a simplified cross-section view of an embodiment of a cathode-gate thyristor having a positive gate current.
Figure 6:
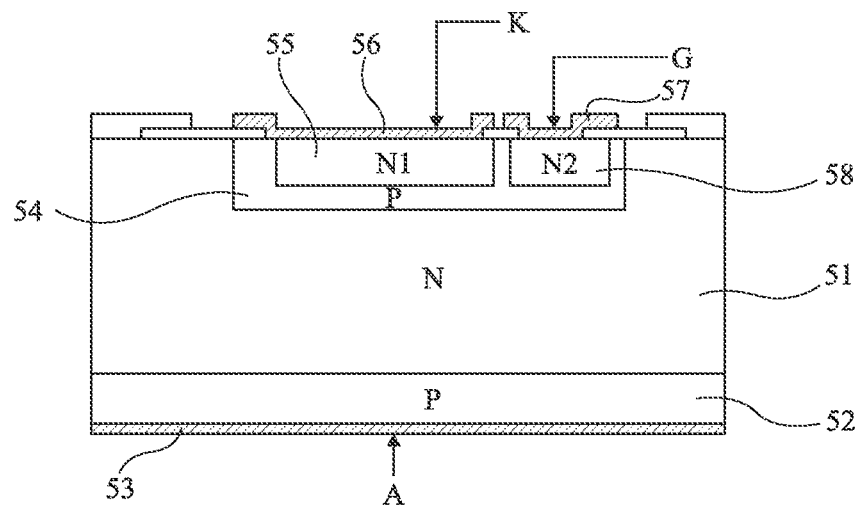
FIG. 6 is a simplified cross-section view of an embodiment of a cathode-gate thyristor having a negative gate current.

FIGS. 5 and 6 are simplified cross-section views of embodiments of cathode-gate thyristors, respectively with a positive gate current or a current injection (most current case) and with a negative gate current or a current extraction.

According to these examples, the thyristor is formed in an N-type substrate 51. At the rear surface, a P-type layer 52 defines an anode region, anode electrode A being obtained by a contacting metallization 53 of region 52. A P-type well 54 is formed at the front surface. An N-type cathode region 55 (N1) is formed in well 54 and a contacting metallization 56 of this region 55 defines cathode electrode K.

In the case of FIG. 5, a gate contact 57 is formed at the level of P-type well 54. Thus, the injection of a gate current turns on the thyristor if the latter is properly biased (positive anode-cathode voltage).

In the case of FIG. 6, an N-type region 58 (N2) is added under gate contact 57. Region 58 allows a turning-on by a negative gate current (that is, flowing from cathode K to gate G) by allowing an electron injection into N-type substrate 51, which corresponds to the base of the NPN-type bipolar transistor formed by regions 52-51-54.

As a variation, region 58 may be divided at least in two to allow a direct contact of the P region (54) with the gate. Such a variation, called "short-circuit hole", enables to improve the immunity to voltage transients of the thyristor and thus allows the control by a positive gate current (that is, flowing from gate G to cathode K). Such a variation thus enables the thyristor to be used at the level of component Th2 in the circuit of FIG. 4.

To achieve the inrush current limiter function at the starting of the converter, the use of thyristors makes a phase angle control possible and thus enables to progressively increase the thyristor conduction time to ensure a positive charge of the capacitors connected between terminals 36 and 38 and thus limit the inrush current absorbed between input terminals 12 and 14 at the circuit powering on.

FIGS. 7A, 7B, 7C, and 7D illustrate, in timing diagrams, the operation of the converter of FIG. 3, in the embodiment where thyristors Th1 and Th2 both operate by extraction of current from their gate, in voltage-doubling mode (switch 21 on). These drawings illustrate the operation at the starting of the converter, that is, as long as voltage Vdc has not reached its steady state value, approximately twice the peak value of voltage Vac (approximately 320 volts). FIG. 7A shows examples of shapes of voltage Vac. FIG. 7B illustrates the shape of current IL in inductance L. FIG. 7C illustrates the shapes of gate voltages $V_{GT}$ of thyristors Th1 and Th2 (one peak out of two corresponding to each of the thyristors) with timing of the control pulses at the thyristor gates causing a progressive increase in conduction time of the thyristors over a time period time to control inrush current. FIG. 7D illustrates the shape of the obtained voltage Vdc.

In the example of FIGS. 7A to 7D, a voltage Vac of 320 volts, peak-to-peak, with a 50-Hz frequency, is assumed.

FIGS. 8A, 8B, 8C, and 8D illustrate, in timing diagrams, the operation of the converter of FIG. 3, in the embodiment where thyristors Th1 and Th2 both operate by extraction of current from their gate, in follower mode (switch 21 off). These drawings illustrate the operation at the starting of the converter, that is, as long as voltage Vdc has not reached its steady state value, approximately twice the peak value of voltage Vac (approximately 320 volts). FIG. 8A shows examples of shapes of voltage Vac. FIG. 8B illustrates the shape of current IL in inductance L. FIG. 8C illustrates the shapes of gate voltages $V_{GT}$ of thyristors Th1 and Th2 (one peak out of two corresponding to each of the thyristors) with timing of the control pulses at the thyristor gates causing a progressive increase in conduction time of the thyristors over a time period time to control inrush current. FIG. 8D illustrates the shape of the obtained voltage Vdc.

In the example of FIGS. 8A to 8D, a voltage Vac of 640 volts, peak-to-peak, with a 50-Hz frequency, is assumed. The amplitude of voltage Vdc obtained in follower mode (FIG. 8D) thus is approximately 320 volts as in FIG. 7D.

The phase angle control of thyristors Th1 and Th2, by being turned on in phases of decrease of rectified voltage Vac, according to the capacitor charge level, effectively enables to limit inrush currents at the starting by performing a soft start as shown in FIGS. 7 and 8.

In the representation of FIGS. 7B and 8B, the amplitudes of current IL according to the halfwaves depend on the downstream power consumption of the converter and illustrate an arbitrary example.

Figure 9:
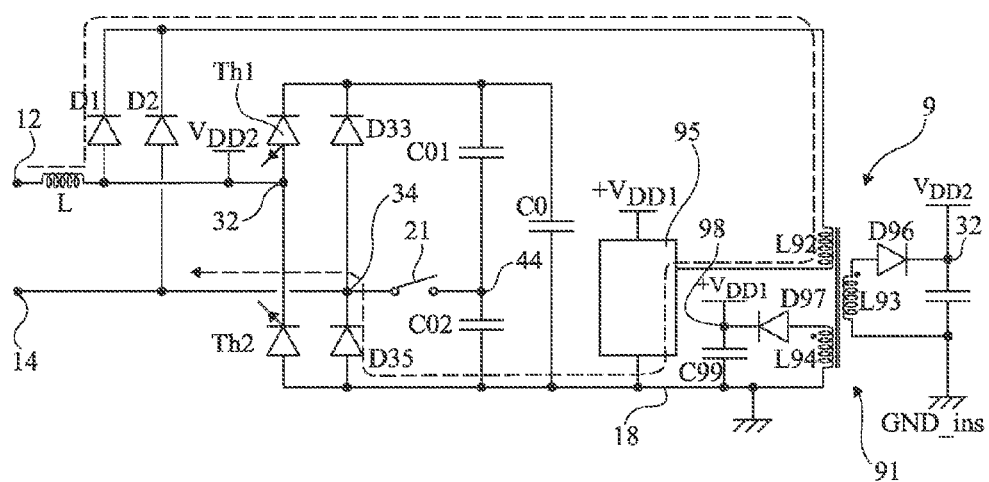
FIG. 9 shows another embodiment of a converter.

FIG. 9 shows another embodiment of an AC/DC converter.

As compared with the embodiment of FIG. 3, a circuit 9 for generating a voltage VDD2 to be applied to terminal 32 is provided. Voltage VDD2 is generated by a transformer 91 generating, from a first winding L92, two DC voltages VDD1 and VDD2 across two coupled windings L93 and L94 (winding L93 being coupled to winding L92 and winding L94 being coupled to winding L93). A diode D1 couples terminal 32 to winding L92 (anode on the side of terminal 32) having its other end coupled to terminal 18 (and thus terminal 38) by an electronic control circuit 95 generally integrating a MOSFET transistor, which controls the current of winding L92 in switched mode. One end of winding L93 is coupled by a diode D96 (anode on the winding side) to terminal 32. Its other end forms the reference of voltage VDD2. One end of winding L94 is coupled by a diode D97 (anode on the winding side) to a terminal 98 providing voltage VDD1. The other end of winding L94 is connected to terminal 18 and a capacitor C99 couples terminals 98 to 18. A diode D2 may couple terminal 14 to winding L92 to power circuit 95 from a fullwave rectification when Th2 is made conductive by control circuit 26 of FIG. 3.

Such an embodiment enables to limit the inrush current if thyristors Th1 and Th2 are controlled in phase angle to achieve the soft start function.

In FIG. 9, a capacitor C0 is further placed in parallel with the series association of capacitors C01 and C02.

Figure 10:
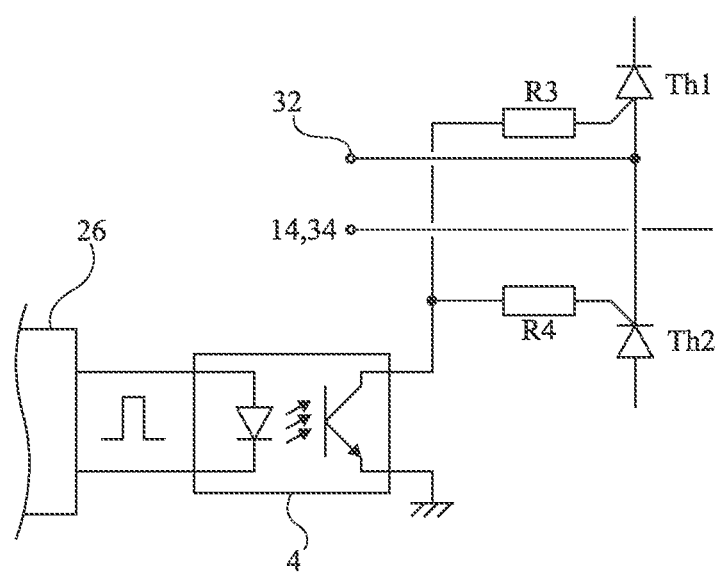
FIG. 10 partially shows a converter control element.

FIG. 10 illustrates, in a partial diagram, an example of control of thyristors Th1 and Th2 by pulses generated by the microcontroller. The gates of thyristors Th1 and Th2 are coupled, by resistors R3 and R4, to the collector of an optotransistor of an optocoupler 4 having its emitter connected to ground. A photodiode of optocoupler 4 is excited by pulses by microcontroller 26.

Various embodiments have been described. Various alterations, modifications, and improvements will occur to those skilled in the art. For example, the thyristors may be replaced with triacs, each series-connected with a diode. Further, the practical implementation of the embodiments which have been described is within the abilities of those skilled in the art based on the functional indications given hereabove. In particular, the programming of the microcontroller depends on the application and the described embodiments are compatible with usual applications using a microcontroller or the like to control a converter.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An AC/DC converter, comprising:
a first terminal and a second terminal configured to receive an AC voltage;
a third terminal and a fourth terminal configured to supply a first DC voltage;
a rectifying bridge having input terminals respectively coupled to the first terminal and second terminal, and having output terminals respectively coupled to the third terminal and fourth terminal,
wherein the rectifying bridge includes a first branch comprising a first thyristor and a second thyristor, respectively having an anode gate and a cathode gate, that are series connected between the output terminals, a junction point of the first and second thyristors being connected to a first one of the input terminals; and
a controller coupled to the anode gate and configured to generate control pulses that turn on the first thyristor, wherein timing of the control pulses progressively increases a conduction time of the first thyristor over a time period time to control inrush current.

2. The converter of claim 1, wherein the first thyristor is controllable by extraction of current from the anode gate.

3. The converter of claim 1, wherein the rectifying bridge further includes a second branch comprising a first diode and a second diode that are series-connected between the output terminals, a junction point of the first and second diodes being connected to a second one of said input terminals.

4. The converter of claim 1, wherein the second thyristor is controlled by injection of current into the cathode gate.

5. The converter of claim 1, wherein the first and second thyristors are both controlled by extraction of current from the anode gate and cathode gate respectively.

6. The converter of claim 1, wherein the control pulses are applied to both the anode gate of the first thyristor and the cathode gate of the second thyristor.

7. The converter of claim 1, wherein the timing of the control pulses provides phase-angle control of the first thyristor.

8. The converter of claim 1, further comprising:
a first capacitor and a second capacitor series-connected between the third and fourth terminals, and
a switch that connects a junction point of the first and second capacitors to the second terminal.

9. The converter of claim 1, wherein a frequency of the control pulses progressively increases over said time period.

10. An AC/DC converter, comprising:
a first terminal and a second terminal configured to receive an AC voltage;
a third terminal and a fourth terminal configured to supply a first DC voltage;
a rectifying bridge having input terminals respectively coupled to the first terminal and second terminal, and having output terminals respectively coupled to the third terminal and fourth terminal,
wherein the rectifying bridge includes a first branch comprising a first thyristor and a second thyristor, respectively having an anode gate and a cathode gate, that are series connected between the output terminals, a junction point of the first and second thyristors being connected to a first one of the input terminals; and
a controller configured to generate first control pulses coupled to the anode gate that turn on the first thyristor and generate second control pulses coupled to the cathode gate that turn on the second thyristor, wherein timing of each of the first and second control pulses progressively increases a conduction time of the first and second thyristors, respectively, over a time period time to control inrush current.

11. The converter of claim 10, wherein the first and second control pulses are interleaved.

12. The converter of claim 10, wherein the first thyristor is controllable by extraction of current from the anode gate.

13. The converter of claim 10, wherein the rectifying bridge further includes a second branch comprising a first diode and a second diode that are series-connected between the output terminals, a junction point of the first and second diodes being connected to a second one of said input terminals.

14. The converter of claim 10, wherein the second thyristor is controlled by injection of current into the cathode gate.

15. The converter of claim 10, wherein the first and second thyristors are both controlled by extraction of current from the anode gate and cathode gate respectively.

16. The converter of claim 10, wherein the timing of the first and second control pulses provides phase-angle control of the first second thyristors, respectively.

17. The converter of claim 10, further comprising:
- a first capacitor and a second capacitor series-connected between the third and fourth terminals, and
- a switch that connects a junction point of the first and second capacitors to the second terminal.

18. The converter of claim 10, wherein a frequency of the first and second control pulses progressively increases over said time period.

\* \* \* \* \*